US006548109B1

(12) United States Patent
Hagquist et al.

(10) Patent No.: US 6,548,109 B1
(45) Date of Patent: Apr. 15, 2003

(54) METHOD OF POWDER COATING WOOD SUBSTRATE

(75) Inventors: James A. E. Hagquist, St. Paul, MN (US); Walter J. Blatter, Woodbury, MN (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 0 days.

(21) Appl. No.: 09/917,611

(22) Filed: Jul. 27, 2001

(51) Int. Cl.[7] .............................. B05D 1/12; B05D 7/06; B32B 21/08

(52) U.S. Cl. ........................ 427/195; 427/470; 427/485; 427/202; 427/393; 428/413; 428/423.1; 428/537.1

(58) Field of Search ................................. 427/470, 475, 427/485, 195, 202, 203, 393, 397; 428/535, 537.1, 413, 423.1

(56) References Cited

U.S. PATENT DOCUMENTS

| | | | | |
|---|---|---|---|---|
| 5,344,672 | A | | 9/1994 | Smith |
| 6,132,883 | A | * | 10/2000 | McGrath et al. |
| 6,146,709 | A | * | 11/2000 | Katz et al. |
| 6,146,710 | A | * | 11/2000 | Symons |
| 6,153,267 | A | | 11/2000 | Horinka et al. |
| 6,348,242 | B1 | * | 2/2002 | Daly et al. |

* cited by examiner

*Primary Examiner*—Fred J. Parker
(74) *Attorney, Agent, or Firm*—Bin Su

(57) ABSTRACT

The invention relates to a process for coating powders on wood substrate comprising pre-treating at least one surface of the substrate with a substantially solvent free treating composition, applying a powder coating composition on the pre-treated surface of the substrate; and curing the powder coating composition. The treating composition includes at least one thermoset material and has a viscosity that is sufficiently low to allow the treating composition to wet out the surface(s) of the substrate and to penetrate into the surface fiber structure of the substrate.

31 Claims, No Drawings

METHOD OF POWDER COATING WOOD SUBSTRATE

FIELD OF THE INVENTION

The invention is directed to a method of reinforcing wood substrate with a substantially solvent-free treating composition. The invention is also directed to a method of powder coating wood substrate including pre-treating the substrate surface(s) with a substantially solvent-free treating composition prior to powder coating.

BACKGROUND OF THE INVENTION

Powder coated composite wood such as powder coated medium density fiberboard (MDF) is often used in the office furniture industry for desktops, drawers, kitchen cabinet doors, etc., as it provides a decorative appearance as well as performance advantages such as toughness and hardness. However, it has been a challenge to coat wood substrate by means of conventional electrostatic application of powder coatings. A wood substrate has very low electrical conductivity, which comes from its moisture content. Without sufficient conductivity, wood substrate can not attract enough powder to its surface(s) to form a uniform coating. To obtain a uniform coating, conventional processes have tried to pre-heat the substrate. Pre-heating the substrate dries off surface moisture, which helps to reduce outgassing during the cure cycle. Pre-heating the substrate, however, tends to drive more moisture out of round edges and/or routed areas of the substrate. As the drying of the surface(s) of the substrate reduces the electrical conductivity of the surface(s), especially at round edges and/or routed areas, it is even more difficult to coat powder on sharp edges and corners to obtain a uniform coating using traditional electrostatic technique.

Other proposals for obtaining a uniform coating include pre-coating substrate with aqueous and/or organic solvent-based primers prior to the application of the powder coatings. While helping to provide electrical charge for roughened edges or difficult to coat areas, the aqueous primer systems tend to warp the surface(s) of the substrate and to raise the grain of the surface(s); and the organic solvent-based primer systems bring various undesirable volatile components into the environment.

It is desirable to obtain a uniform powder coating on wood substrate, especially around sharp edges, corners and routed areas of the substrate. It is also desirable to obtain a smooth powder coating on wood substrate, which minimizes pinholes and other surface defects. It is also desirable to obtain a high performance powder coating on wood substrate as defined by hardness, toughness, and impact resistance, etc.

SUMMARY OF THE INVENTION

In one aspect, the invention features a method of reinforcing wood substrate. The method includes (a) applying a substantially solvent-free treating composition on at least one surface of the substrate, and (b) optionally curing said treating composition. The treating composition includes at least one thermoset material and has a viscosity sufficiently low to allow the treating composition to wet out the surface (s) of the substrate and penetrate into the surface fiber structure of the substrate.

In another aspect, the invention features a method of powder coating wood substrate. The method includes (a) pre-treating at least one surface of the substrate with a substantially solvent-free treating composition, (b) applying a powder coating composition on the pre-treated surface, and (c) curing the powder coating composition. The treating composition includes at least one thermoset material and has a viscosity sufficiently low to allow the treating composition to wet out the surface(s) of the substrate and penetrate into the fiber structure of the substrate.

In one embodiment, the treating composition is preferably a substantially solvent-free liquid. In other embodiments, the treating composition is preferably a 100% solids liquid at ambient conditions.

In yet another aspect, the invention features an article manufactured by the reinforcing method. The article includes a wood substrate having at least one surface treated by a treating composition that is optionally cured. The article exhibits improved electrical conductivity and toughness.

In yet another aspect, the invention features an article manufactured by the powder coating method. The article includes a wood substrate having at least one surface treated by a treating composition, and a continuous uniform powder coating deposited thereon. The treating composition is integrally cured into the surface fiber structure. The powder coating is either crosslinked with or adhered to the treating composition upon final cure, depending on the specific formulations, to form an integrated composite.

In one embodiment, the wood substrate has round edges and corners, and/or routed areas.

The methods of the invention are particularly advantageous with respect to wood substrate. The substrate may preferably be pre-treated at ambient temperature without the need to pre-heat it. Pre-treating the substrate with a substantially solvent free, liquid treating composition would slow down the moisture evolution from the substrate, especially from the round edges and/or routed areas so that these areas would not be dried out as they would by the conventional pre-heating. The reduced moisture evolution helps to maintain the capability of the overall substrate to carry sufficient electrical charge for efficient electrostatic application of the powder coating to the substrate since the substrate will not dry out as quickly during heating. Hence, a continuous uniform coating on the substrate including even difficult to coat areas such as sharp edges and corners can be obtained even if the substrate may not be pre-heated and the powder coating may be applied at ambient temperature. By the pre-treatment, pinholes and other defects on the powder-coated surface(s) can also be minimized and even eliminated. In addition, curing the treating composition prior to the application of the powder coating composition is optional.

The methods of the invention can minimize, and preferably, eliminate the emission of volatile organic component (VOC) associated with the use of conventional solvent-based primer systems.

The treated substrate exhibits improved electrical conductivity, especially at sharp edges, comers and routed areas. The treated substrate also exhibits reinforced surface quality including e.g., stronger surface fiber bond strength and increased impact resistance relative to the untreated substrate. In one embodiment, the treated substrate exhibits good adhesive bondability to the powder coating such that the substrate does not flake apart when a crosshatch adhesion test is performed.

DETAILED DESCRIPTION OF THE INVENTION

The treating composition is substantially solvent-free, i.e., it does not contain water and it does not contain any substantially amount e.g., greater than 10 wt %, and in some cases, greater than 5 wt %, based on the total weight of the treating composition, of organic solvent(s). The treating composition is preferably free of volatile organic solvent(s). More preferably tie treating composition is a substantially solvent-free liquid, and most preferably a 100% solids liquid, i.e., a liquid thermoset free of volatile components and aqueous and/or organic solvent(s).

The treating composition is formulated to have a viscosity such that it can effectively wet out the surface(s) of the substrate and preferably penetrate into the surface fiber structure of the substrate. Preferably, the viscosity of the treating composition is such that the treating composition does not form an appreciable coating film on the surface(s) of the substrate to achieve the desirable binding and/or reinforcing effect to the surface fiber. The treating composition preferably has a viscosity of no greater than about 5,000 cps, more preferably no greater than about 1,000 cps, and even more preferably no greater than about 100 cps at 77° F.

The treating composition is formulated to be preferably compatible with powder coatings or other topcoats. The treating composition is also formulated to be preferably electrically conductive.

The treating composition includes at least one thermoset material. Useful thermoset materials include, e.g., one-part moisture curable polyurethanes, trimerized polyurethanes, latent cured alkyd resins, modified plastisols, latent cured liquid epoxies, moisture curable epoxies, and combination thereof.

One-part moisture cure polyurethanes include isocyanate terminated prepolymers that include reaction products of at least one isocyanate compound with at least one dihydroxy polyol. Examples of useful dihydroxy polyols include, e.g., polyester polyols, polyether polyols, polyalkylene polyols, and mixtures thereof. A plasticizer may be added to reduce the viscosity; and a catalyst to expedite a further moisture cure when exposed to the moisture in the air. Useful isocyanates include any aromatic or aliphatic isocyanates. Examples of useful isocyanates include PAPI 20, 27 and 94 from Dow Chemical Co., (Midland, Mich.); Mondur MRS, MR, M, MRS-10 from Bayer Corporation, (Pittsburgh, Pa.); and Rubinate M, 1680 and 1820 from Huntsman Corp. (Houston, Tex.). Examples of useful polyols include VORANOL 220-028 to 240–800 from Dow Chemical Co.; Poly G 20–28 to 85–36 from Arch Chemical, (Norwalk, Conn.); Rubinol 428 to X F 460 from Huntsman Corp. Examples of plasticizer include Santicizer 141, 160 and 278 from Ferro Corp, (Bridgeport, N.J.); and Eastman DOA, DOP and TXIB from Eastman Chemical Company (Kingsport, Tenn.). Examples of useful catalysts include JEFFCAT™ PMDETA, DMDEE and ZF-20 from Huntsman Corp.; and DABCO T-12 and BL-11 from Air Products (Allentown, Pa.).

The one-part moisture cure polyurethane preferably has a viscosity of no greater than about 15,000 cps at 77° F., and weight average molecular weight (Mw) of no greater than about 3,000.

Useful latent cured alkyd resins include reaction products of (1) a drying oil component such as tung oil, linseed oil, perilla oil, oiticica oil, menhaden oil, safflower oil, soybean oil caster oil, or dehydrated castor oil, etc.; (2) a polyol component such as propylene glycol, trimethylol propane, pentaerythritol, etc.; (3) a polycarboxylic acid component such as phthalic acid or anhydride, maleic acid or anhydride, etc.

Typically, alkyd resins are cured with a latent metal drying catalyst such as cobalt naphthenates, cobalt octoates or cobalt tallates. Commercially available catalysts include, e.g., NAP-All, HEX-CEM and LIN-ALL from Mooney Chemicals (Cleveland, Ohio) and NUODEX Driers from Huls America (Piscataway, N.J.).

Modified plastisols are compositions including finely divided polymeric resin particles dispersed in a plasticizer. Useful polymeric resins include dispersion grade polyvinyl chloride resins such as Geon Resin 198 and 199 from Polyone Corp. (Cleveland, Ohio) and Formolon NV from Formosa Plastics Corp., (Livingston, N.J.), polyvinyl acetate resins, copolymers of vinyl chloride with vinyl addition monomers such as vinylidene chloride and acrylonitrile. Blends of several different polymeric resins can also be used. Useful plasticizers include monomeric plasticizers such as monomeric esters of phthalic, benzoic, succinic, adipic, sebacic, talic lauric, azelaic, caprylic, hexanoic, phosphoric, oleic, glutaric, trimellitic, stearic acids, and esters (particularly benzoate and isobutyrate esters) of trimethylpentanediols. Examples of useful plasticizers include dioctyl phthalate,ethylene glycol dibenzoate, dioctyl succinate, dibutyl sebacate, dibenzyl azelate, didecyl glutarate, 2,2,4-trimethyl-1,3-pentanediol, citric acid esters, n-ethyl toluenesultonamide, and diisodecyl phthalate. Commercially available plasticizers include Santicizer 141,160 and 278 from Ferro Corp., and Eastman DOA, DOP and TXIB from Eastman Chemical Company.

Latent cured liquid epoxies are liquid epoxy resins cured with either amine or Lewis acid catalysts. Useful epoxy resins have an epoxy equivalent weight of from about 156 to about 350. Examples of useful liquid epoxy resins include those derived from the reaction product of bisphenol A with epichlorohydrin, preferably diglycidyl ether of bispenol A, novalac epoxies, epoxies from bisphenol F, aliphatic and cycloaliphatic epoxies, etc. Commercially available examples include Epoxide Resin ERL-4221, DER 331 and 438 from Dow Chemical Co., (Midland, Mich.), EPON 828 and 862 from Resolution Performance Products (Houston, Tex.).

Optionally, epoxy diluent(s)s may be included within the epoxy resin as purchased or later added to lower the viscosity. Epoxy diluents as defined here are similar to the above mentioned epoxy resins except that there are an average of from about one to less than about two epoxy groups per molecule. These are preferred to non-reactive diluents in that they are capable of being chemically bound into the epoxy network and thus are not easily volatilized. Preferably, the epoxy diluents have a lower viscosity than the above epoxy resins, such as less than about 1,500 cps, more preferably, less than about 1,000 cps, and most preferably less than about 500 cps, as measured by a Brookfield viscometer at 100° F.

Typically, epoxy resins are cured with a curing agent, or catalyst. The curing agent may be an amidopolyamine such as a fatty acid polyethyleneamine based polyamide; a polyamine such as diethylene triamine, triethylene tertramine or higher homologues; a latent curing system such as a mixture of Ancamine ™ 2014 FG and dicyandiamide. Lewis acids such as boron trifluoride or aluminum chloride can also be used. Examples of commercially available curing agents or catalysts include Dyhard 100S from Degussa-Huls Corp. (Marietta, Ga.), Omicure-24 from CVC Specialty Chemicals (Maple Shaoe, N.J.) and FC-520 from 3M Company (St. Paul, Minn.).

The treating composition may further include at least one viscosity modifier to reduce the viscosity of the composition. Suitable viscosity modifiers exhibit low viscosity and a flash point of preferably greater than about 100° F., more preferably greater than about 250° F. Suitable viscosity modifiers are preferably liquid at ambient temperature and do not contain any functional groups including, e.g., hydroxyl, amine, carboxyl, or thiol groups, which would react with the isocyanate groups in the polyurethane chain when the treating composition includes a one-part moisture cure polyurethane. The viscosity modifier preferably has a viscosity of no greater than about 200 cps, more preferably, from about 10 to about 200 cps at 77° F.

Examples of useful viscosity modifiers include e.g., mineral oils; vegetable oils; hydrocarbon oils that are low in aromatic content and are paraffinic or naphthenic in character; epoxidized soya oil; liquid resins; phthalate esters such as dimethyl phthalate (DMP), diethyl phthalate (DEP), dibutyl phthalate (DBP), di-(2-ethylhexyl) phthalate (DOP), di-(2-ethylhexyl ) terephthalate (DOTP), stabilized di-(2-ethylhexyl) terephthalate (DOTP-CA); benzoate plasticizers; triacetin; tripropionin; di-2-ethylhexyl adipate; and mixtures thereof. Commercially available viscosity modifiers include KAYDOL™ White Mineral Oil from Witco Corp. (New York, N.Y.); Eastman DIOP and TXIB Plasticizer from Eastman Chemical Company; and Santicizer 160 from Ferro Corp.

The viscosity modifier may be present in the treating composition in an amount effective to reduce the viscosity of the treating composition such that the composition can be readily applied on the surface(s) of the substrate, wet out the surface(s) and preferably penetrate into the surface fiber structure at application temperature. The viscosity modifier is present in an amount of up to about 75 wt %, preferably from about 2 wt % to about 75 wt %, based on the total weight of the treating composition.

The treating composition may also include at least one catalyst to accelerate the curing speed without adversely affecting any other properties of the treated substrate. Examples of useful catalysts include those which contain ether and morpholine functional groups such as 2,2-dimorpholinoethyl ether and di(2,6-dimethyl morpholinoethyl)ether; 4,4-(oxydi-2,1-ethanediyl)bis-morpholine; tertiary amine such as triethylene diamine; organo tin, zinc and bismuth catalysts such as dibutyl tin dilaurate, dibutyl tin diacetate and bismuth octoate, and mixtures thereof. Commercially available catalysts include 4,4-(oxydi-2,1-ethanedyl) bis-morpholine know as JEFFCAT™ DMDEE from Huntsman Corp.; Dabco T-9 and T-12 from Air Products; and Coscat 83 from Caschem, (Bayonne, N.J.).

The catalyst is present in an amount effective to accelerate the rate of cure. Where the treating composition includes one-part moisture cure polyurethane, the catalyst is present preferably in an amount effective to optimize the rate of cure with the desired work life of an applicator. The work life of an applicator is the period in which the treating composition can stay on the applicator before it becomes too difficult to be applied on the surface(s) due to the moisture cure reaction of the exposed material. The catalyst is present in an amount of up to about 2.0 wt %, preferably from about 0.05 wt % to about 0.5 wt %, based on the total weight of the composition.

The treating composition may also include other optional additives including e.g., wetting agents, surfactants, and defoamers, pigments, antioxidants, UV stabilizers, latent catalysts, conductive pigments, conductive polymers, powdered metals, salts, and combinations thereof.

The treating composition can be prepared by conventional processes. For example, the treating composition including one-part moisture cure polyurethane can be prepared by first preparing the polyurethane prepolymer, i.e., the isocyanate-terminated polyurethane prepolymer, and then blending the prepolymer with other optional ingredient(s). Alternatively, the composition can be prepared by preparing the isocyanate-terminated polyurethane prepolymer together with other optional ingredient(s), such as viscosity modifier(s) and/or catalyst(s). Thus, any optional ingredient (s) can be added prior to, during, or after the formation of the prepolymer. The treating composition obtained preferably has a % NCO by weight of preferably from about 1% to about 15%, more preferably from about 5% to about 10%, based on the total weight of the composition.

A variety of powder coating compositions can be used including, e.g., thermoplastic powder coating compositions, thermosetting powder coating compositions, UV-curable powder coating composition and hybrid UV/heat-curable powder coating compositions, depending on the desirable performances of the final coatings. The invention is generally applicable to various powder coating chemistries including, e.g., hybrid, epoxy, acrylic, polyester, urethane, etc.

A variety of other topcoats can also be used including, e.g., paints, varnishes, lacquers, vinyl films, decorative papers, and laminates, etc.

The methods of the invention are particularly advantageous in treating substrates which have low electrical conductivity or no electrical conductivity and which, preferably, are capable of absorbing a liquid, such as wood substrate or cellulosic material. Wood is defined as including natural wood and engineered wood such as plywood, particleboard, oriented strand board, hardboard, medium density fiberboard, and the like. Wood having moisture content of from about 3% to about 10% by weight is preferred, with medium density fiberboard being more preferred.

The treating composition can be applied on at least one surface of the substrate by any applicable application techniques including e.g., roll coating, curtain coating, spray, dip coating, etc. The application temperature, defined as the substrate surface temperature, varies depending on the specific formulations. The treating composition is preferably applied at a temperature of from about ambient temperature to about 350° F., more preferably from about ambient temperature to about 200° F. In one embodiment, the treating composition is applied at ambient conditions, e.g., ambient temperature of from about 55° F. to about 80° F., preferably from about 70° F. to about 77° F., and ambient relative humidity of from about 10% to about 70%, preferably from about 45% to about 55%.

The treating composition is preferably penetrate into the surface fiber structure of the substrate once applied thereon. Penetration across the thickness of the substrate to various depths depends on a variety of factors including, e.g., the specific formulations, the amount of the treating composition to be applied, the substrate surface temperature, the desirable performance and the end use.

The amount of the treating composition to be applied to the substrate varies within a wide range depending on a variety of factors including, e.g., the treating process, process considerations, desirable performance of the treated substrate, and the cost, etc. Preferably, the treating composition is applied in an amount effective to achieve the desired effect of enhancing the electrical charge capacity of the substrate and improving the surface quality of the substrate at the lowest cost. Useful application includes applying the treating composition on at least one surface of the substrate in an amount of preferably at least about 1.5 g/ft$^2$, more preferably from about 1.5 g/ft$^2$ to about 25 g/ft$^{2.}$ The treating composition may optionally be cured prior to the application of any topcoats such as powder coatings. Where the treating composition includes a one-part moisture cure polyurethane, the treating composition can be cured by contacting moisture at application temperature once it is applied on the substrate. A variety of methods can be used to contact the treating composition with moisture including, e.g., exposing the composition to ambient moisture; contacting the composition with moisture in the form of a spray, mist, fog or a combination thereof; or placing the composition in a chamber with high humidity (e.g, greater than about 75% relative humidity), and combinations thereof.

More advantageously, the treating composition may not need to be cured under heat, or may not need to be fully cured under heat prior to the application of any topcoat such as powder coating compositions, depending on factors such as the existing production line, process considerations, etc. In one embodiment, the treating composition is formulated to be curable at ambient conditions. In other embodiments, the treating composition is formulated to be cured simultaneously with the powder coating composition. In either case, a step of heat curing the treating composition prior to the application of topcoats such as powder coating is not needed.

The powder coating composition can be applied on the pre-treated substrate using any conventional powder coating deposition techniques including e.g., electrostatic spray. The powder coating composition can be applied at a temperature of from about ambient temperature to about 350° F., preferably from about ambient temperature to about 250° F. The pre-treated substrate may or may not be pre-heated depending one process considerations.

The powder coating composition can be cured using any conventional manners such as with heat or UV light to form a continuous uniform coating. Likewise, other topcoats can be applied and cured using any conventional techniques, too. Preferably, the powder coating composition or other topcoats, if applicable, is cured simultaneously with the treating composition.

The invention also features an article including wood substrate treated with a treating composition. The treating composition may optionally be cured.

The invention also features an article including wood substrate treated with a treating composition and a continuous uniform coating deposited thereon formed from a cured powder coating composition, or any other topcoat. The treating composition is integrally cured into the surface fiber structure of the substrate. The topcoats such as powder coating is also integrally bonded with the treating composition upon final cure. The topcoat such as powder coating exhibits overall coverage on round edges or routed areas of the substrate as a uniform coating. The article exhibits enhanced surface properties such as conductivity, smoothness, hardness, toughness, improved impression resistance, etc. The surface(s) of the article also exhibit very good adhesive bondability to secondary or topcoats such that the topcoat, e.g., the powder coating forms strong adhesive bonding with the treated surface(s) of the article.

The articles have a variety of applications including e.g., desktops, tabletops, kitchen cabinet doors, display racks, moldings, furniture, etc.

The invention is further illustrated by the following non-limiting examples. All the parts, percentages, ratios, amounts are by weight except otherwise specified.

EXAMPLES

Testing Methods

Gardner Impact Resistance

The Gardner impact resistance is measured using BYK-Gardner Heavy Duty Impact Tester from BYK Gardner, (Rivers Park II, Md.).

Ball Impact Resistance

The ball impact resistance is measured according to National Electrical Manufactures Association (NEMA) Standards Publication LD-3 (1995), 3.8 Ball Impact Resistance. cl Adhesion Test The adhesion of a powder coating to a treated substrate is tested according to ASTM D 3359-93 Standard Test Methods for Measuring Adhesion By Tape Test, Test Method B using a 6"×6"×¾" medium density fiberboard as the substrate.

Conductivity

About 3.0 g of a treating composition is applied on a surface of a 6"×6"×¾" medium density fiberboard (MDF) panel at ambient temperature and the weight of the treated panel is measured. A hybrid powder coating composition is applied using a bottom feed GEMA gun with a 1¼" conical nozzle at ambient temperature. The gun is fixed 10" from the panel. The air pressure is set at 16 psi and the gun setting is 100 KV. The panel is sprayed for 6 seconds. The weight of the powder-coated panel is measured. Reporting an average weight difference and percentage weight change (% weight change).

Example 1

A treating composition was prepared as follows.

To a reaction vessel were added under vacuum 33.5 wt % PAPI 94, a polymeric isocyanate from Dow Chemical Co. (Midland, Mich.), 16.38 wt % Voranol 220–056, a polyether polyol having less than about 0.05% water content from Dow Chemical Co., and 50.0 wt % Eastman TXIB, a plasticizer from Eastman Chemical Company (Kingsport, Tenn.). The temperature was raised to about 175° F. and the reaction was allowed to continue for about 2.5 hours. Upon completion of the reaction, the temperature of the vessel was cooled to about 104° F. 0.12 wt % JEFFCAT™ DMDEE, a catalyst from Huntsman (Houston, Tex.) was added to the vessel and mixed for about 30 minutes. The resultant content of the vessel was discharged through 400 micron filter to obtain a treating composition having % NCO by weight of about 10% and a viscosity of about 80 cps at 77° F.

The treating composition was applied on a medium density fiberboard (MDF) panel at ambient temperature. The treated panel was heated in an oven at about 300° F. for about 10 minutes and then allowed to cool to ambient temperature. A hybrid powder coating composition was applied on the treated surface of the panel using an electrostatic gun, followed by curing at about 350° F. for about 20 minutes. The cured panel was designated as 1-A.

The treating composition was also applied on a medium density fiberboard panel that had been in an oven at about 300° F. for about 10 minutes, and followed by the application of the powder coating composition. The powder-coated panel was cured at about 350° F. for about 20 minutes. The cured panel was designated as 1-B.

The treating composition was also applied on a medium density fiberboard panel at ambient temperature, and followed by the application of the powder coating composition. The powder coated panel was designated as 1-C.

Both panels 1-A and 1-B were tested according to Adhesion test method, Gardner and Ball Impact resistance test methods. The testing results are listed in Table I.

Panel 1-C was tested according to Conductivity test method. The edge coverage was evaluated by visional inspection. The testing results are listed in Table II.

Example 2

Three medium density fiberboard (MDF) panels were treated and powder-coated using the same procedures as Example 1, except that the treating composition was prepared by combining 98 wt % of Castung 103 G-H, a dehydrated castor oil from Caschem with 2 wt % cobalt naphthenate. The panels were designated as 2-A, 2-B and 2-C, respectively, and the testing results are listed in Table I and Table II, respectively.

Example 3

Three medium density fiberboard (MDF) panels were prepared using the same procedures as Example 1, except that the treating composition was prepared by combining 48.8 wt % Epoxide Resin ERL-4221, a cyclo-aliphatic epoxy from Dow Chemical Co., 0.80 wt % FC-520, a catalyst from 3M Company, 0.40 wt % Aerosil 812-S from Degussa, and 50.0 wt % Eastmen TXIB, a plasticizer from Eastmen. The panels were designated as 3-A, 3-B and 3-C, respectively, and the testing results are listed in Table I and Table II, respectively.

Comparative Example 1

Three medium density fiberboard (MDF) panels were powder-coated using the same procedures as Example 1, except that no pre-treatment was carried out. The panels were designated as Com. 1-A, Com. 1-B and Com. 1-C, respectively, and the testing results are listed in Table I and Table II, respectively.

TABLE I

| | Adhesion (Cross-cut) | Impact Resistance: Garden Impact (in. lb) | Impact Resistance: Ball Impact (in.) |
|---|---|---|---|
| 1-A | 5B | 6 | 55 |
| 1-B | 5B | 6 | 39 |
| 2-A | 5B | 4 | 52 |
| 2-B | 5B | 4 | 36 |
| 3-A | 5B | 4 | 48 |
| 3-B | 5B | 4 | 48 |
| Com 1-A | 4B | <2 | 33 |
| Com 1-B | 4B | <2 | 33 |

Example 4

A medium density fiberboard (MDF) panel was prepared using the same procedures as Example 2 (2-C), except that the treating composition was prepared by combining 40 parts the treating composition of Example 2 with 17.1 parts Zelec ECP 1401M, a conductive pigment from Milliken (Inman, S.C.). The powder-coated panel was designated as 4-C and the testing results are listed in Table II.

Example 5

A medium density fiberboard (MDF) panel was prepared using the same procedures as Example 4 (4-C), except that Zelec ECP 1401T was used instead of Zelec ECP 1401M. The powder-coated panel was designated as 5-C and the testing results are listed in Table II.

Comparative Example 2

A medium density fiberboard (MDF) panel was prepared using the same procedures as Comparative Example 1 (Com. 1-C). The powder-coated panel was designated as Com. 2-C and the testing results are listed in Table II.

TABLE II

| | Electrical Conductivity: Weight Difference (g) | Electrical Conductivity: % Weight Change | Edge Coverage |
|---|---|---|---|
| 1-C | 1.98 | +8.8 | Good |
| 2-C | 1.64 | −9.9 | Poor |
| 3-C | 2.19 | +20.1 | Good |
| Com. 1-C | 1.82 | control | Poor |
| 4-C | 1.74 | +21.3 | Good |
| 5-C | 1.78 | +24.5 | Good |
| Com. 2-C | 1.43 | control | Poor |

We claim:

1. A method of coating wood substrate, comprising:

a) pre-treating at least one surface of said substrate with a substaiitially solvent-free treating composition, said treating composition comprising at least one thermoset material and having a viscosity that is sufficiently low to allow said treating composition to wet out said surface and to penetrate into surface fiber structure of said substrate;

b) applying a powder coating composition chosen from thermosetting powder coating compositions, UV curable powder coating compositions, and hybrid UV/thermosetting powder coating compositions on said pre-treated surface of said substrate; and c) curing said powder coating composition.

2. The method of claim 1, wherein said curing includes simultaneously curing said treating composition.

3. The method of claim 1, further comprising a step of curing said treating composition prior to the application of said powder coating composition.

4. The method of claim 1, further comprising a step of heating said pre-treated substrate prior to the application of said powder coating composition.

5. The method of claim 1, wherein said treating composition is a liquid.

6. The method of claim 1, wherein said thermoset material is selected from the group consisting of one-part moisture curable polyurethanes, trimerized polyurethanes, latent cured alkyd resins, modified plastisols, latent cured liquid epoxies, moisture cure epoxies, and combination thereof.

7. The method of claim 6, wherein said thermoset material comprises one-part moisture cure polyurethanes or latent cured liquid epoxies.

8. The method of claim 1, wherein said treating composition has a viscosity of no greater than about 5,000 cps at 77° F.

9. The method of claim 8, wherein said treating composition has a viscosity of no greater than about 100 cps at 77° F.

10. The method of claim 1, wherein said treating composition further comprises at least one viscosity modifier.

11. The method of claim 10, wherein said treating composition comprises from about 2 wt % to about 75 wt % viscosity modifier.

12. The method of claim 1, wherein said treating composition further comprises at least one catalyst.

13. The method of claim 1, wherein said treating composition further comprises at least one additive selected from the group consisting of wetting agents, surfactants, defoamers, pigments, antioxidants, UV stabilizers, latent catalysts, antistats, conductive pigments, conductive polymers, powdered metals, and combination thereof.

14. The method of claim 1, wherein said treating composition is applied at a temperature of from ambient temperature to about 200° F.

15. The method of claim 1, wherein said treating composition is applied in an amount of from about 1.5 g/ft$^2$ to about 25 g/ft$^2$.

16. The method of claim 1, wherein said treating composition is a liquid thermoset free of volatile components and aqueous and/or organic solvent(s).

17. A method of reinforcing wood substrate, comprising treating said wood substrate by applying a substantially solvent-free treating composition on at least one surface of said substrate, said treating composition comprising at least one thermoset material chosen from one-part moisture curable polyurethanes, trimetized polyurethanes, latent cured alkyd resins, modified plastisols, latent cured liquid epoxies, and combination thereof and having a viscosity that is sufficiently low to allow said treating composition to wet out said surface and to penetrate into surface fiber structure.

18. The method of claim 17, further comprising curing said treating composition.

19. The method of claim 17, wherein said treating composition is a liquid thermoset free of volatile components and aqueous and/or organic solvent(s).

20. The method of claim 17, further comprising a step of applying a topcoat on the treated substrate.

21. The method of claim 17, wherein said topcoat comprises powder coatings, paints, varnishes, lacquers, decorative papers, or vinyl films.

22. A method of coating wood substrate, comprising:

a) pre-treating at least one surface of said substrate with a treating composition said treating composition comprising greater than 90 wt % of at least one thermoset material and having a viscosity that is sufficiently low to allow said treating composition to wet out said surface and to penetrate into surface fiber structure of said substrate;

b) applying a powder coating composition chosen from thermosetting powder coating compositions, UV curable powder coating compositions, and hybrid UV/thermosetting powder coating compositions on said pre-treated surface of said substrate; and c) curing said powder coating composition.

23. The method of claim 22, wherein said curing includes simultaneously curing said treating composition.

24. The method of claim 22, further comprising a step of curing said treating composition prior to the application of said powder coating composition.

25. The method of claim 22, further comprising a step of heating said pre-treated substrate prior to the application of said powder coating composition.

26. The method of claim 22, wherein said at least one thermoset material is chosen from one-part moisture curable polyurethanes, trimerized polyurethanes, latent cured alkyd resins, modified plastisols, latent cured liquid epoxies, moisture cure epoxies, and combinations thereof.

27. An article produced by the method of claim 1.

28. An article produced by the method of claim 17.

29. An article produced by the method of claim 7.

30. An article comprising:

a wood substrate, a cured treating composition on at least one surface of said substrate, said treating composition being substantially free of solvent, comprising at least one thermoset material, and having a viscosity that is sufficiently low to allow said treating composition to wet out said surface and to penetrate into surface fiber structure of said substrate; and a cured powder coating composition deposited on said treating composition, said powder coating composition being chosen from thermosetting powder coating compositions, UV curable powder coating compositions, and hybrid UV/thermosetting powder coating compositions.

31. An article comprising a wood substrate and a treating composition on at least one surface of said substrate, said treating composition being substantially free of solvent, comprising at least one thermoset material chosen from one-part moisture curable polyurethanes, trimerized polyurethanes, latent cured alkyd resins, modified plastisols, latent cured liquid epoxies, and combination thereof, and having a viscosity that is sufficiently low to allow said treating composition to wet out said surface and to penetrate into surface fiber structure of said substrate.

* * * * *